July 3, 1962   E. R. WORKMAN   3,041,962
BANDING MACHINE
Filed Dec. 31, 1956   7 Sheets-Sheet 1

INVENTOR.
ERNEST R. WORKMAN.
BY
ATTORNEYS

July 3, 1962 E. R. WORKMAN 3,041,962
BANDING MACHINE
Filed Dec. 31, 1956 7 Sheets-Sheet 2
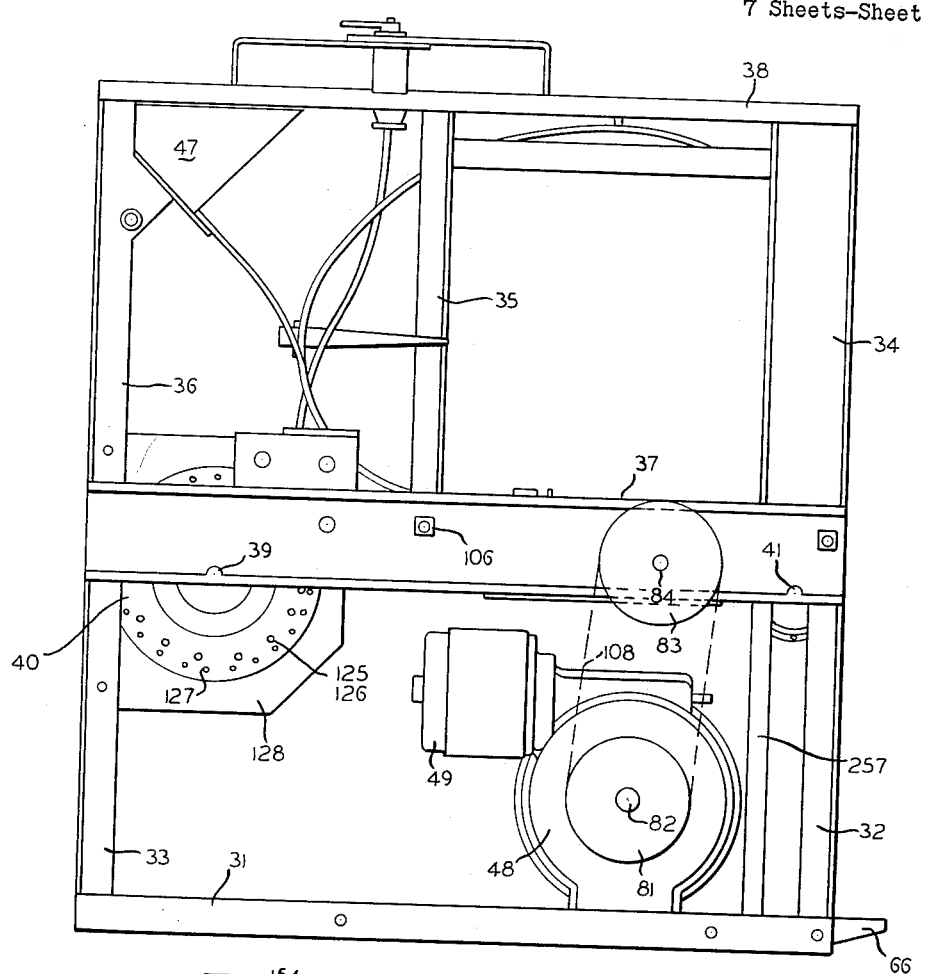
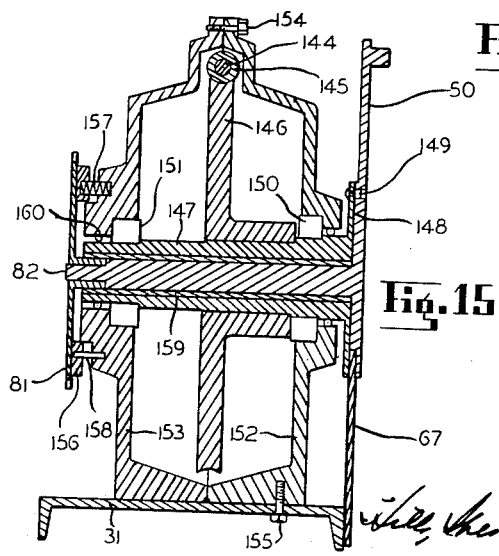
Fig. 2
Fig. 15
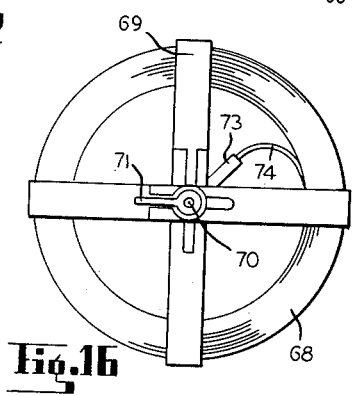
Fig. 16
INVENTOR.
ERNEST R. WORKMAN.
BY
ATTORNEYS July 3, 1962 E. R. WORKMAN 3,041,962
BANDING MACHINE
Filed Dec. 31, 1956 7 Sheets-Sheet 3
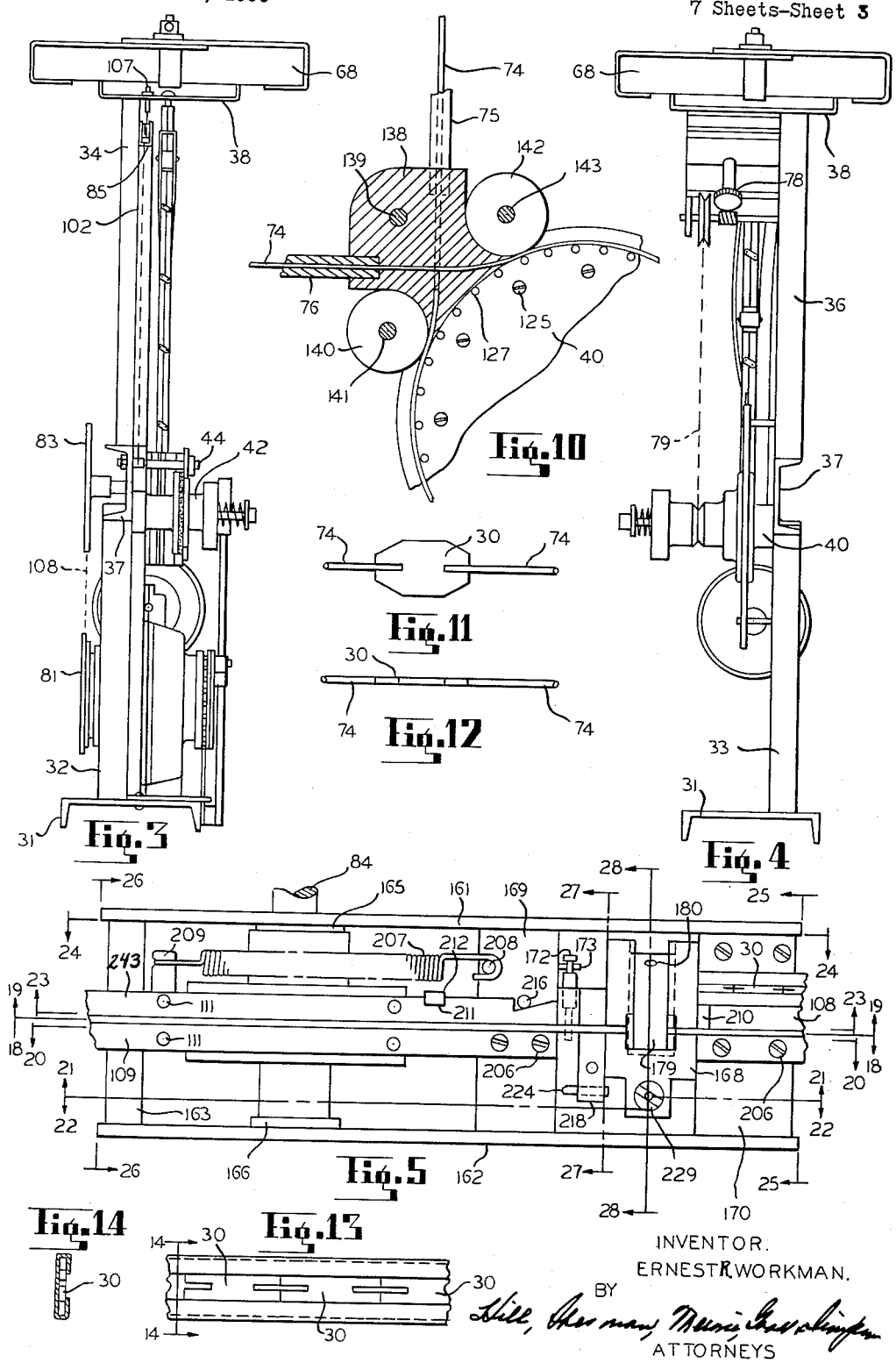
INVENTOR.
ERNEST R. WORKMAN.
ATTORNEYS

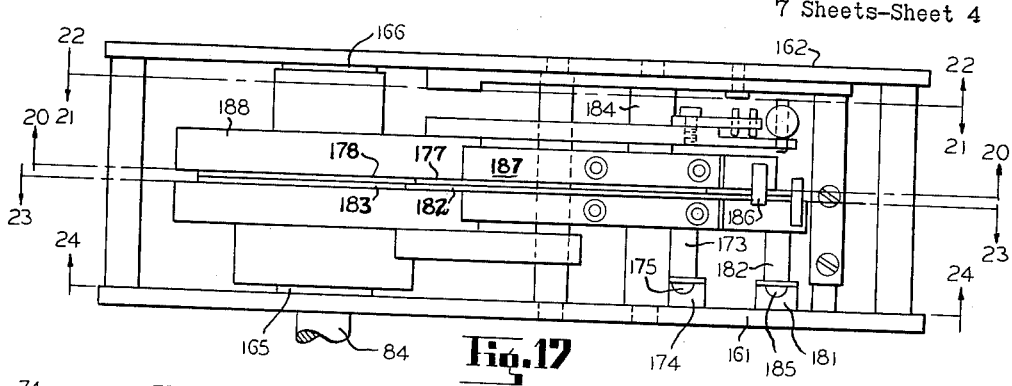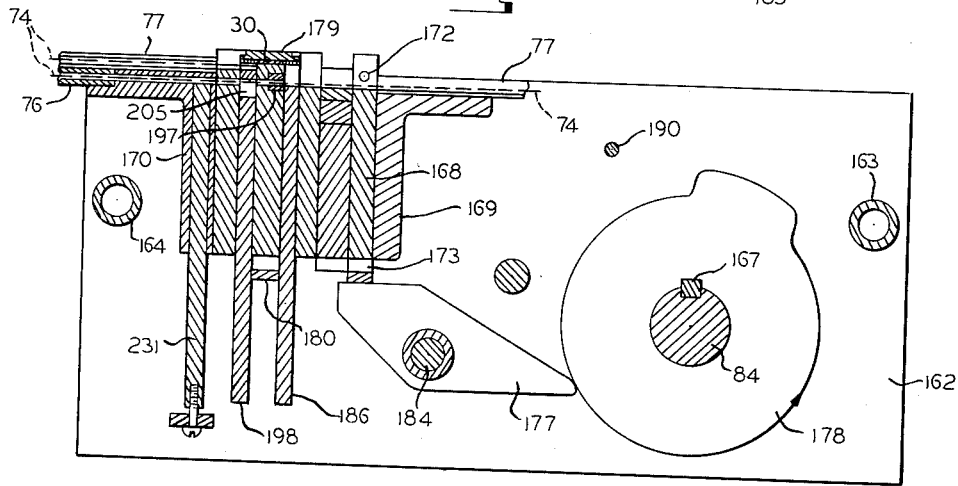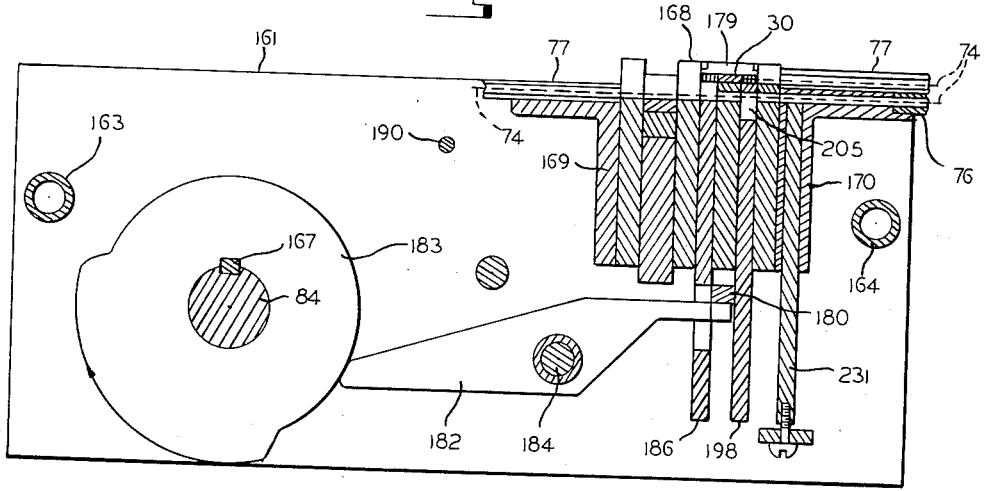

July 3, 1962 E. R. WORKMAN 3,041,962
BANDING MACHINE
Filed Dec. 31, 1956 7 Sheets-Sheet 6
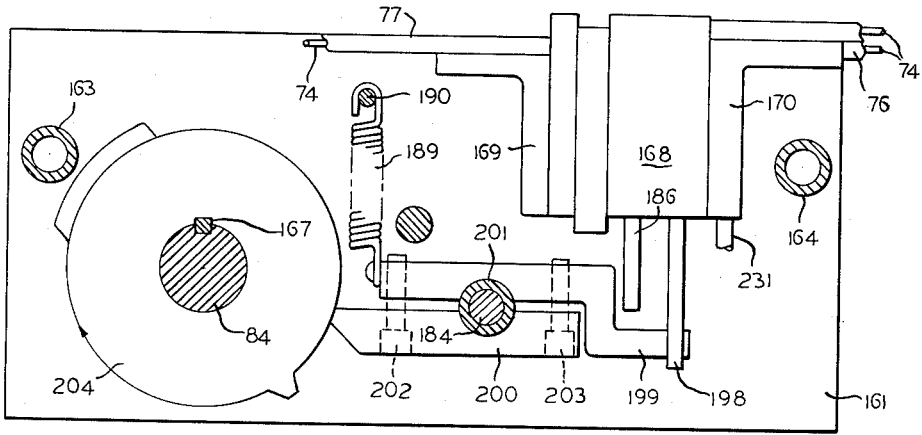
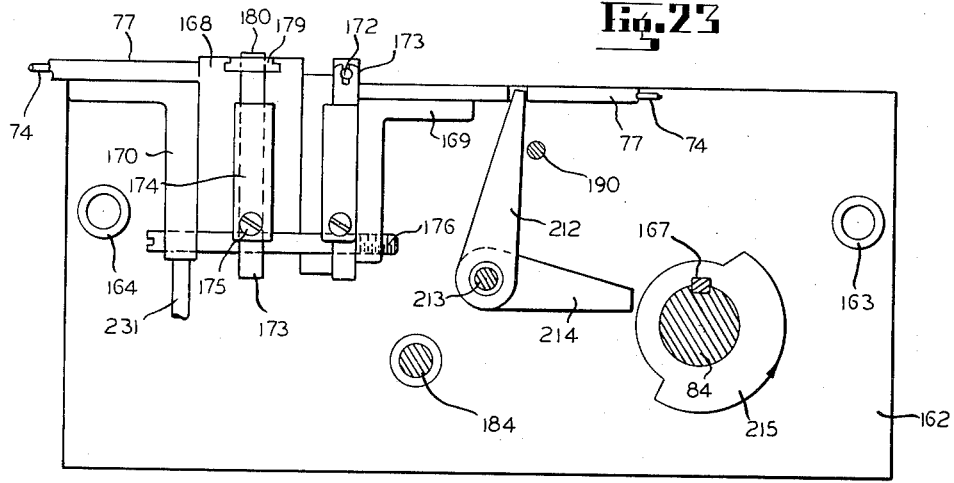
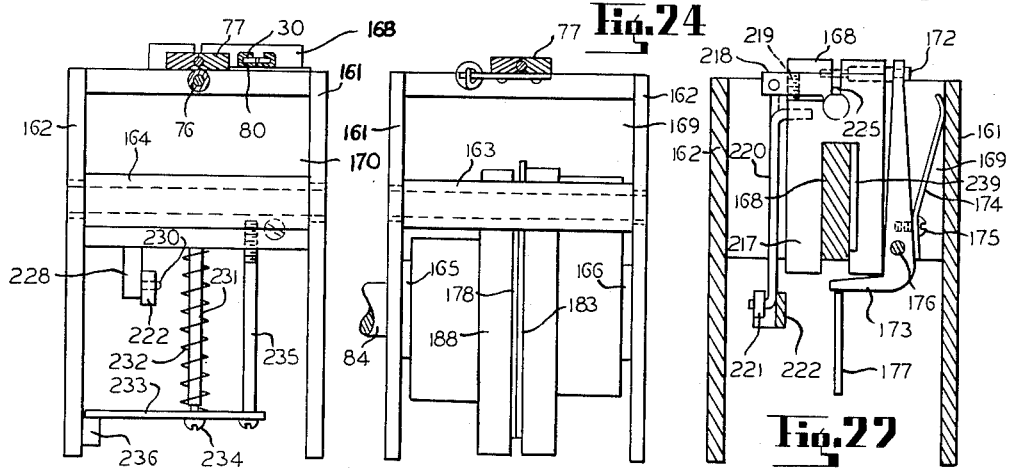
INVENTOR.
ERNEST R. WORKMAN.
BY
ATTORNEYS July 3, 1962 E. R. WORKMAN 3,041,962
BANDING MACHINE
Filed Dec. 31, 1956 7 Sheets-Sheet 7

INVENTOR.
ERNEST R. WORKMAN
BY
ATTORNEYS

United States Patent Office 3,041,962
Patented July 3, 1962

3,041,962
BANDING MACHINE
Ernest R. Workman, 3334 W. 63rd St., Chicago, Ill.
Filed Dec. 31, 1956, Ser. No. 631,725
12 Claims. (Cl. 100—26)

This invention relates to a machine for applying and securing a metallic band around an object or group of objects.

In its preferred embodiment the invention relates to improvements in a machine for withdrawing wire from a stationary coil, similar to that coil described in Patent 2,567,537, and feeding the wire so withdrawn into an enclosure for use either as a tight secured package reinforcement, or tie, or as a structural banding tie.

A further object of the invention is to provide a machine that will automatically perform feeding or tensioning steps of an operative cycle wherein the velocities of the fed or tensioned wire will gradually wave during the first portion of each step from zero to summit and gradually wave back to zero during the last portion of the same step, thereby avoiding the damage to mechanism which usually results from continuous sudden starts and stops of the feeding and tensioning steps of operating cycles.

Another object of this invention to perform the steps of cutting and securing the wire around an object during intervals between the steps of tensioning and of feeding the wire in which intervals power consumed is inversely to the velocities and this feature of the invention provides for a reserve of power for performing said steps of cutting and securing the wire.

Still another object of this invention is to provide a machine to feed wire into an enclosure and to secure a clip to its free end similar to the clip described in Patent 2,653,362, the enclosure shaped to guide the fed wire into a loop form for contracting by tensioning the formed loop around an object. Said enclosure may be straight for producing structural elements or banding ties for use with hand operated tools.

Still a further object of the invention is to provide an enclosure for positioning band closing clips fed from a chamber for holding a supply of clips, and combined with clip feeding apparatus and tubing for guiding the fed clips to the said clip enclosure.

And it is a further object of the invention to provide a machine with simple mechanism that will be more economical to construct than the machines now in use, and a machine that will perform automatically the complete necessary steps of feeding wire into loop form, contracting and tensioning the formed loop around an object, maintaining the tension in the band, cutting the tensioned band from its supply source, connecting the ends of the tensioned band to a securing clip and ejecting the connected band and clip from the machine.

Throughout this application where the word wire appears it is intended to include flat band, plastic, tape, string or other banding material and the clips may also be of plastic or other band closing material.

The invention consists of various features and elements of construction in combination, as hereinafter shown and described, as indicated by the accompanying drawings and in the claims.

In the drawings the cover of the machine has been removed to make clear the structure of the invention.

FIGURE 3 is an end elevational view of one end of the machine shown in FIGURE 1.

FIGURE 4 is an end elevational view of the opposite end of the machine shown in FIGURE 1.

FIGURE 5 is a top view of the cutting and clip attaching mechanism of the machine shown in FIGURE 1 taken on line 5—5, FIGURE 1.

FIGURE 7 is a sectional view taken on line 7—7 of FIGURE 6.

FIGURE 10 is a fragmentary section view showing how the wire enters and leaves the feeding and tensioning roller.

FIGURE 11 is a plan view of a clip and two free ends of wire secured together.

FIGURE 12 is a side view of the clip and wire portion shown in FIGURE 11.

FIGURE 13 is a fragmentary top view of a section of the clip tube taken on line 13—13 of FIGURE 1.

FIGURE 14 is a view taken on line 14—14 of FIGURE 13.

FIGURE 15 is a sectional view of the reduction gear and tripping clutch taken on line 15—15 of FIGURE 1.

FIGURE 16 is a top view of the wire coil and its holding clamp taken on line 16—16 of FIGURE 1.

FIGURE 17 is a bottom view of the clip attaching and cutting mechanism taken on line 17—17 of FIGURE 1.

FIGURE 18 is a fragmentary sectional view taken on line 18—18 of FIGURE 5.

FIGURE 19 is a partial sectional view taken on a line 19—19 of FIGURE 5.

FIGURE 23 is a section in part view taken on line 23—23 of FIGURE 5.

FIGURE 24 is a section in part view taken on line 24—24 of FIGURE 5.

FIGURE 25 is an end view of the clip attaching and wire cutting mechanism taken in the direction of the arrows as shown by line cutting mechanism taken in the direction of the arrows as shown by line 25—25 of FIGURE 5.

FIGURE 26 is an end view of the clip attaching and wire cutting mechanism taken in the direction of the arrows as shown by line 26—26 of FIGURE 5.

FIGURE 27 is a sectional view in part of the clip attaching and wire cutting mechanism taken on line 27—27 of FIGURE 5.

Figure 1:
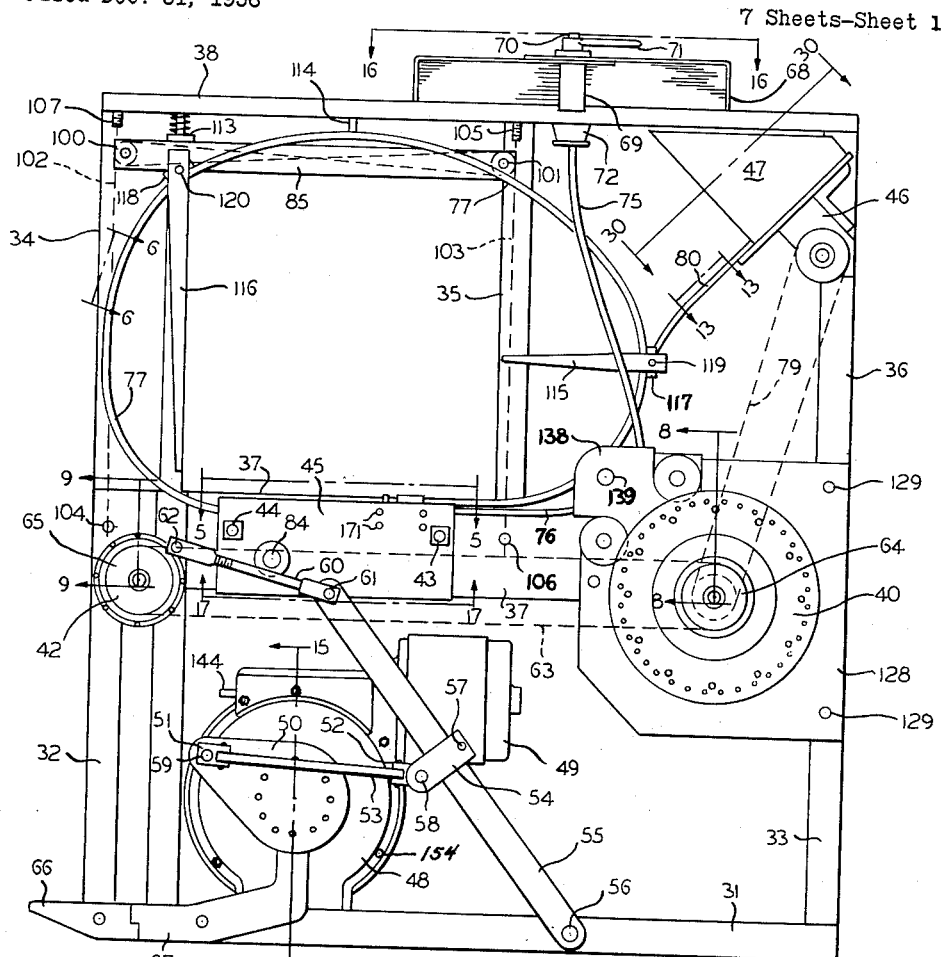
FIGURE 1 is a side elevational view of a banding machine embodying this invention.

With former wire feeding, tensioning and forming machines the wire or banding material is fed and tensioned at constant velocities and the sudden starts and stops of these steps during continuous operative cycles of the machines give erratic lengths to the fed wire and also eventually results a breakdown of mechanisms embodied with these machines which in turn creates delays in the production and assembly lines of such machines providing such vital equipment. Furthermore the closing of the ends of banding loops around objects by the present methods of twisting usually leave sharp projections at the connected portions which involve a serious liability of damage to persons and property during shipping and handling of the banded objects. The present invention eliminates these hazards, by making a smooth connection in the closed band which has no projections beyond the normal thickness of the wire or banding material in the band.

Referring to figures of the drawings a main frame of the machine includes: a base 31; uprights 32, 33, 34, 35 and 36; an object support 37; a top member 38; a spindle 39 for mounting a roller type wire feeding and tensioning unit 40; a spindle 41 for mounting a press driving unit 42 (see FIGURE 2); two threaded studs 43 and 44 for mounting a wire cutting and clip securing unit 45 and a bracket 46 for mounting a clip feeding unit 47.

This frame may be constructed of standard steel portions welded together, or it may include suitable castings if so desired.

Mounted on the base 31 is a speed reduction unit 48 through which an electric motor 49 turns a crank 50 and by bearings 51 and 52 and a rod 53 the outer pivot of this crank 50 is connected to a pivot 58 of an adjusting slide 54 that is clamped in its adjusting position on a lever 55 by a screw 57 so that the turning of this crank 50 serves to reciprocate the lever 55 around a pivot 56 that is rigid with the lever 55 and is journalled in the base 31 of the frame. At the upper end of the lever 55 is an adjustable connecting rod 60 that has its one end pivoted to the lever 55 by the pivot 61 and its opposite end pivoted to a silent driving chain 63 (shown by dotted line) by a pivot 62 so that reciprocation of the lever 55 around its pivot 56 will rotate chain gear 64 and a second chain gear 65 with wave-like velocities in both forward and reverse directions a distance limited by the position of the clamped slide 54 on the lever 55.

A foot pedal 66 is secured to the main frame of the unit by a pivot 66a and a clutch wedge 67 is also secured to the main frame of the machine by a pivot 67a. Both the pedal and the wedge are held between operative cycles of the machine in the relative position shown in FIGURES 1 and 15 by a spring 67b (FIG. 3), said spring secured to the main frame of the machine by a rivet 67c. The pedal 66 and the spring 67b are arranged to maintain the wedge between the hub of the crank 50 and the flange 148, on the hollow shaft 147, so as to space the hub from the flange sufficient to withdraw the plurality of pins 149 (FIG. 15) which project from the flange 148, from their respective holes in the crank hub and thereby disengage the crank hub from the continuous rotating flange 148 when the crank has been rotated to the inoperative position shown in FIGURE 1. When the pedal is depressed the wedge is withdrawn from between the crank hub and the rotating flange permitting springs 157 to arrange the holes in the crank hub into engagement with the projecting pins of the rotating flange for one complete revolution of the crank.

Supported by the top member 38 of the main frame is a stationary coil 68 of wire having its coil form maintained in position by four clamped members such as 69. Said members 69 can be secured in their clamped position by a pivot 70 and a nut 71 (see FIGURE 16). A rotatable takeoff tube 73 is pivotally secured to the top member 38 by means of a bearing 72 and is rotated by the wire strand 74 in a right hand direction during the step of an operative cycle when the wire is being withdrawn from the coil 68 by the roller unit 40. The wire is guided through a tube 75 and fed by the roller unit through a second guide tube 76 (FIGURE 10) and through the wire cutting and clip attaching unit 45 and into the loop forming enclosure 77. When the roll unit 40 is reversed for contracting the formed loop and tensioning it around an object by retracting a portion of the fed wire 14, the takeoff tube will be rotated in a reverse or left hand direction for recoiling the retracted wire back into the coil 68.

The clip feeding unit 47 may be of any one of those now in use or on the market and may be actuated through a pair of gears 78 (see dotted line FIGURE 4), by a belt 79, and a tube 80 serving to carry the fed clips from the clip feeder and deliver them to the clip attaching and wire cutting unit 45.

The crank 50 is pivoted by a shaft 82, said shaft extending through the reduction gear 48 (see FIGURES 2 and 15), and has keyed to its opposite end a chain gear 81 for driving through a chain 108 (see dotted line) a like chain gear 83 for the purpose of rotating a cam shaft 84 that is journalled to the wire cutting and clip attaching unit 45.

Figures 2, 6:
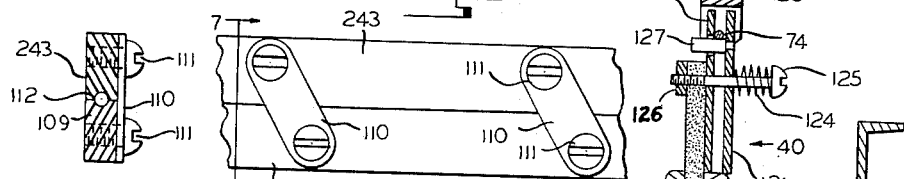
FIGURE 2 is a side elevational view of the opposite side of the machine shown in FIGURE 1.
FIGURE 6 is a fragmentary view of the enclosure for the wire taken on a line 6—6 of FIGURE 1.

A pressing member, or channel 85, is mounted with a rack 86 (see FIGURE 9) that has teeth 87 thereon for meshing with the teeth of a pinion 88. A tube 257 is provided for guiding the lower end of rack 86, as shown by FIGURE 2. Said pinion 88 is driven by means of a friction disc 89 secured to the pinion 88 by rivets such as 90. A disc 91 is suitably positioned by a bushing 92 mounted on the spindle 41 and is secured in rotatable manner with the chain gear 65 by pins or dowels such as 93. Bearings 94 and 95 are provided between pinion 88, gear 65 and spindle 41. An adjusting screw 96 with washers 97 and 98 is provided to transmit adjusted exertion of a spring 99 through chain gear 65 and the disc 91 which are positioned against the opposite sides of the friction disc 89.

Referring to FIGURES 1 and 3 the press channel 85 has, near its opposite ends, rollers 100 and 101 secured between the legs of the channel by pivots 100a and 101a. A cable 102 (shown by dotted line) is anchored to the frame member 34 at its lower end by a bolt 104; said cable passing over said roller 100 and under roller 101 and then anchored at the upper end to the frame member 38 by a tension adjusting screw 105. A second cable 103 has one end anchored to the frame by a bolt 106; said cable passes over the roll 101 and under the roll 100 and then anchored to the frame by a second tension screw 107; said cables 102 and 103 maintain the press channel at all times in a horizontal relation with support 37 during its pressing movements against an object positioned on said support 37.

The enclosure 77 for guiding the wire fed by the roller unit 40 into loop form comprises bars 243 and 109 (see FIGURES 6 and 7) hinged together by a plurality of bars, or other suitable connections 110 and pivotal screws 111. The bars 243 and 109 have grooves in their meeting edges that provides an enclosure 112 for guiding the fed wire 74 into loop form when the parts are held in lengthwise relation to each other; the connections 110 being in the diagonal relation to the bars as shown in FIGURE 6. When the bars 243 and 109 are moved in lengthwise relation to each other so as to change the position of the connections 110 from that of diagonal to that of transversing the parts 243 and 109, the bars 243 and 109 will be separated so that a wire may be removed laterally from the enclosure 112.

The top frame member 38 carries a spring bumper 113 for limiting the upward movement of the pressing channel 85. The enclosure 77 is mounted and secured to this top member 38 by a member 114. Guides 115 and 116 are pivoted by pins 119 and 120 to brackets 117 and 118 respectively, said brackets are rigidly mounted with respect to enclosure 77 for maintaining the wire loop in a definite plane when it is being withdrawn from the enclosure 112 and tensioned around the object.

Figures 8, 9:
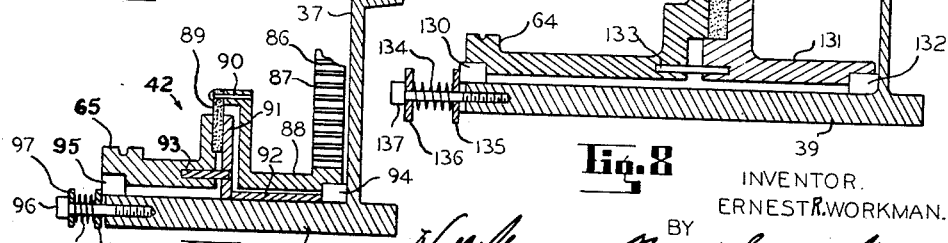
FIGURE 8 is a sectional view of the feeding and tensioning roller taken on a line 8—8 of FIGURE 1.
FIGURE 9 is a sectional view of the object pressing mechanism taken on line 9—9 of FIGURE 1.

The wire tensioning and gripping roller 40 will be understood by referring to FIGURES 8 and 10 wherein the wire 74 is pressed between plates 121 and 122. Said plates are secured to a rotatable friction plate 123 by a plurality of springs 124. The pressure by the plates 121 and 122 against the wire 74 can be predetermined by the plurality of adjusting screws 125 mounted in and with nuts 126. A plurality of pins 127 are rigidly mounted with the plate 121, and extend loosely through the plate 122. The peripheral surface of said pins 127 provide a perimeter between the plates 121 and 122 for supporting the wire 74 during rotation of the roller 40. An outer plate 128 is bolted to the main frame by bolts and nuts 129 to prevent an outward movement of a free end of wire riding the perimeter. The chain gear 64 has a bearing 130 associated therewith. A hub 131 has a bearing 132 associated therewith. Loosely fitted dowels 133 are suitably mounted to position the flange on the hub 131 uniformly against the friction plate 123 so that the pressure of the spring 134 between washers 135 and 136 is transmitted from washer 135 through bearing 130 and through chain gear 64 against a side of the friction disc 123 and is also transmitted from washer 136 through: screw 137, spindle 39, bearing 132 and hub 131 against the opposite side of the friction disc 123; so that the pressure against opposite sides of the friction plate 123 may be varied by adjustment of screw 137. A guide block 138 is secured to a projection 37a (FIG. 2) from the main frame by a bolt 139 (see FIGURE 10). The opening within the guide tube 75 is extended through the block 138 for guiding wire between an idler disc 140 (FIG. 10), that is mounted on said projection from the main frame for rotation on a stud 141, and the perimeter provided by the plurality of pins 127. The opening within the tube 76 is also extended into said block 138; said opening for guiding the wire to and from between a second idler disc 142, that is also mounted on main frame for rotation on a stud 143, and to said perimeter formed by the pins 127. The enclosure or opening extension from the tube 75 is offset with relation to the opening extension from the tube 76 so that wire entering the roller 40 will cross the wire leaving the roller 40. In addition to guiding the wire 74 between the plates 121 and 122 the discs 140 and 142 spread the discs, or plates 121 and 122 from each other thereby permitting free entry and exit of the wire 74 from and between the plates 121 and 122 without frictional contact with the plates.

With reference to the reduction gear 48 (see FIGURES 1 and 15) the shaft 144 of the electric motor 49 carries a worm 145 that is in mesh with a worm gear 146 which is keyed to a hollow shaft 147. The shaft 147 has a flange 148 that carries a plurality of rigid pins 149 that projects loosely through corresponding holes in the crank 50. The shaft 147 is journalled by bearings 150 and 151 that are seated in the housing of the reduction gear. This reduction gear housing comprises two parts 152 and 153 that are secured to each other by bolts such as 154 and it is also secured to the base of the frame by bolts such as 155.

A ring 156 is pressed against the chain gear 81 by springs 157 (see FIGURE 15), said springs being loosely seated in the ring 156 and also loosely seated in a portion of the housing 153. Pilot pins 158 are likewise loosely seated in the ring 156 and said housing 153 so that during rotation of the chain gear 81 a sliding action may take place between the gear and the ring. A bearing bushing 159 journals the crank shaft 82 in the hollow shaft 147. Oil retaining O rings 160 are suitably positioned between said shaft 147 and housing 153.

The wire cutting and clip attaching unit 45 is driven by the chain gear 83 and the chain 108 since the chain gear 81 is rigid with the crank shaft 82 which rotates with the crank 50 (see FIGURES 1 and 2). The details of the unit 45 will be best understood by referring to FIGURES 5 and 17 to 28. Side plates 161 and 162 of the unit are secured together by shouldered bushings 163 and 164 (see FIGURES 25 and 26) that have openings therethrough that correspond with mounting studs 43 and 44 of the main frame. The cam shaft 84 is journalled to the side plates 161 and 162 by bearings 165 and 166 and this shaft 84 carries a key 167 for positioning a number of rotatable cams which together with their functions will be explained hereinafter.

A block 168 is secured to angle plates 169 and 170 by any suitable means, said block may be built up of parts or machined from a solid (see FIGURES 24 and 18). Said plates 169 and 170 are secured to the plates 161 and 162 by screws such as 171 (see FIG. 1). Slidably mounted in an opening in the block 168 (see FIGURE 27) is a retaining pin 172 operable by a lever 173 actuated by a spring 174 that is secured to the lever by a screw 175 (see FIGURES 5, 17, 18 and 20) and this lever 173 rotates on a pin 176 that is mounted to the angle plates 169 and 170 for operation by a second lever 177 (see FIGURE 18) in timed relation determined by a cam 178 which is keyed to the cam shaft 84. The lever 177 is rotatably mounted on a shaft 184.

Figure 28:
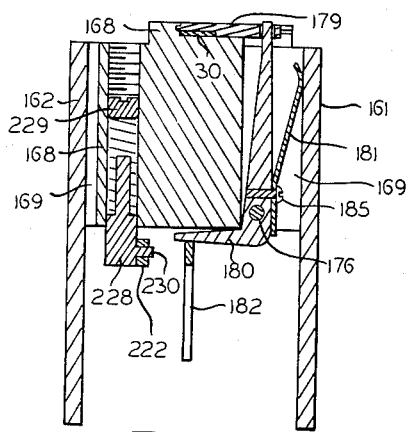
FIGURE 28 is a sectional view in part of the clip attaching and wire cutting mechanism taken on line 28—28 of FIGURE 5.

Slidably mounted in grooves in the block 168 is an anvil 179 (see FIGURES 18 and 28) for operation in timed relation through a lever 180 actuated by a spring 181 (FIGURE 19); said spring 181 is secured to the lever 180 by a screw 185 (FIGS. 17 and 28). Cam lever 182 is operated by a cam 183. Lever 180 is rotatable on the pin 176 (FIGURE 24). The cam lever 182 is rotatable on the shaft 184. The cam 183 is keyed to the cam shaft 84. Said anvil positions clips delivered by the tube 80 from the clip feeder 47 to the wire cutting and clip attaching unit 45 and secures the positioned clips while the ends of fed wire are being forced into openings in the clips.

Figure 20:
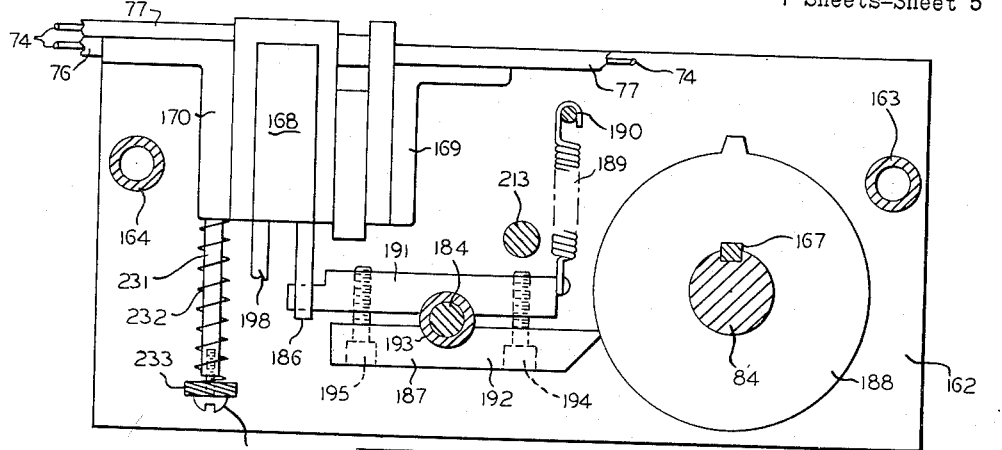
FIGURE 20 is a sectional view, in part, taken on line 20—20 of FIGURE 5.
Figure 21:
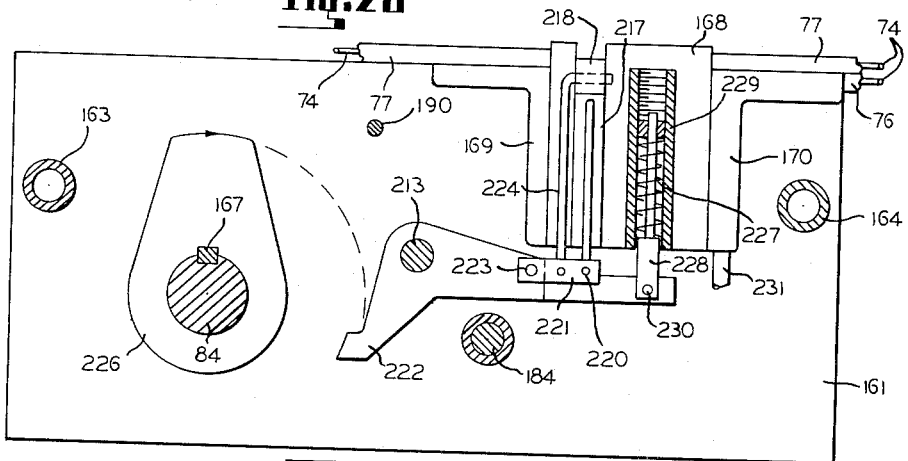
FIGURE 21 is a sectional view, in part, taken on line 21—21 of FIGURE 5.
Figure 22:
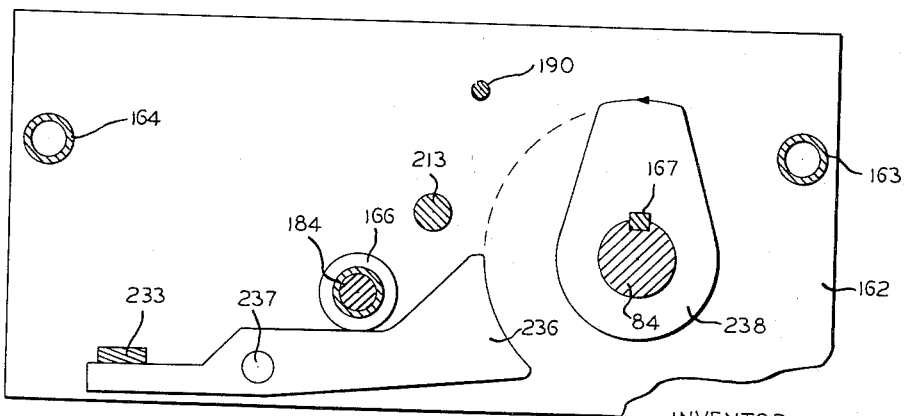
FIGURE 22 is a section in part view taken on line 22—22 of FIGURE 5.

A wire cutting punch 186 is slidably mounted in the block 168 for timed movement by a lever 187 that is composed of a top part 191 and a lower member 192 (FIGURE 20). Said members are clamped to a bearing bushing 193 by adjusting screws 194 and 195 for rotation on the shaft 184 actuated by cam 188 against tension of a spring 189. Said spring has its upper end hooked to a cross bar 190 and its lower end hooked to a projection from the upper member of the lever 187. The adjusting screws 194 and 195 are for limiting the upward movement of the punch 186 for use in firmly forcing the cut end of the wire into the opening of the clip held in position by the anvil 179. By referring to FIGURE 23 it can be seen that by loosening screw 203 and tightening screw 202 that the right end of the cam lever part 199, which contacts the punch 198, will become adjusted upwardly while the left end of the cam lever part 200 will remain in contact with the cam 204 and when the wire is fed from the supply coil with its fed end positioned between the clip 30 and the upper end of the punch 198, as shown in FIGURE 18, it is possible to limit the uppermost movement of the punch 198 to that of just forcing the said end of the fed wire into an opening in the clip 30. Likewise in a similar manner, the cam lever 187 may have its parts 191 and 192 adjusted by the screws 194 and 195 for limiting the upward movement of the punch 186 to that of cutting a tensioned band from the fed wire and forcing the cut end of the band into another opening in the said clip 30, thereby completing a connection in the tensioned band similar to that connection shown in FIGURE 11. A hard ground bushing 197

(FIGURE 18) may be inserted in the block 168 to provide a cooperative shearing edge for the punch 186. A shoulder notch is provided in the punch 186 for permitting passage of the upper member 191 of the lever 187 thereby providing a connection for movement of the punch by the lever 187.

A second punch 198 (FIGURE 23) is slidably mounted in the block 168 for timed movement through a lever comprised of top and bottom members 199 and 200 clamped by screws 202 and 203 to a bushing 201 and driven by a cam 204 that is keyed to the cam shaft 84. Said punch 198 has a shouldered notch in its edge through which the lever member 199 passes for making a connection to the punch, the bushing 201 is carried on the shaft 184 and the screws 202 and 203 are for adjusting the upward movement of the punch to that of securely forcing an end of fed wire firmly into the opening of the clip which is being held positioned in its enclosure by the anvil 179 and the punch has a slot 205 (see FIG. 18) near its upper end for permitting free passage of feeding or retracting wire during movements of the punch.

With reference to the enclosure for guiding the free end of a wire into loop form, the bar 109 (see FIGURES 5 and 6) being secured to the wire cutting and clip attaching unit 45 by screws 206. The enclosure 77 is secured to the top member 38 of the main frame by the connection 114. A spring 207 (FIGURE 5) has one of its ends hooked to a pin 208 that is projecting from the angle plate 169 and its opposite end attached to an extension 209 from one of the pivoted connections 110. The tension of said spring 207 maintains all of the connections 110 in transverse relation to the lengthwise direction of the parts 243 and 109, and in this relative position the said parts are separated from each other to the extent that a wire in the enclosure 112 may then be freely moved laterally from the enclosure. Bar 243 is shorter than bar 109 so that a space 210 exists at an end of bar 243. Said bar 243 has a shouldered notch 211 (FIGURE 5) in which is mounted the upper end of a lever 212 (FIGURE 24). Said lever 212 is rigid on a shaft 213 which is journalled in the plates 161 and 162. A cam lever 214 is also rigid on the shaft 213 so that on rotation of a cam 215, which is keyed to the shaft 84, the bar 243 will be moved lengthwise against the exertion of the spring 207 thereby bringing the members, or connections, 110 into diagonal relation with respect to the parts 243 and 109 as shown in FIGURE 6, thereby forming the enclosure 112 between the bars, or parts, 243 and 209. Upon movement of the part 243, a bevel edge thereon, engages a pin 216 for assisting in completing the closing movement at this point in time for the entry of the fed wire.

The wire gripper has a yoke 217 slidably mounted in grooves in the block 168. A spring 239 (FIGURE 27) is for creating resistance to the sliding action of the yoke 217. A movable jaw 218 is hinged in the upper end of the yoke 217 and an adjusting set screw 219 is inserted in the movable jaw 218. A rod 220 connects the yoke 217 (FIGURE 21) with a tilting lever 221 that is mounted to a cam lever 222 by a pivot 223, said cam lever being rotatably mounted on the shaft 213. A second rod 224 connects the movable jaw 218 also with the tilting lever 221 so that on upward movement of the cam lever 222 tension will be exerted on the rod 220 and compression will be exerted on the rod 224 thereby creating a substantial gripping force on a wire at 225 (FIGURE 27). A cam 226 is keyed to the cam shaft 84 for moving the lever 222 held in contact therewith by a spring 227. Said spring 227 is mounted around a push rod 228 and between a threaded adjusting plug 229 and a pivot 230. Said pivot 230 connects the push rod 228 to the cam lever 222.

Slidably mounted in the angle plate 170 is a wire brake rod 231 (FIGURE 20) that carries a spring 232. The lower end of said rod 231 is connected by a screw 234 to a cross lever 233, the screw 234 passing loosely through the lever. An adjusting screw 235 (FIGURE 25) connects one end of the cross lever 233 to the angle plate 170 and the opposite end of this cross lever 233 rests on a cam lever 236. Said lever 236 is mounted to the plate 162 by a pivot 237. A cam 238 is keyed to the cam shaft 84 to actuate the rod 231 against the moving wire in timed relation providing a step in stopping a movement of the wire during an operative cycle of the machine.

Figure 30:
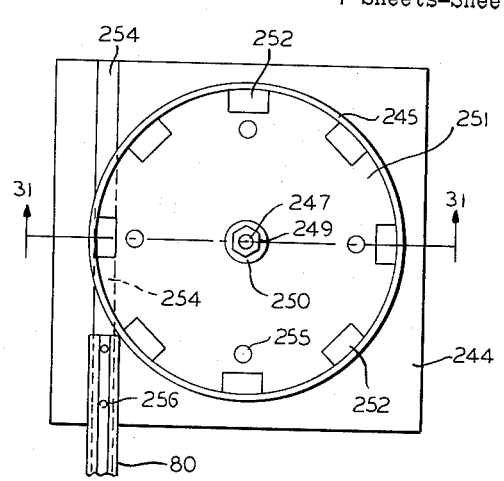
FIGURE 30 is a plan view of the clip feeding unit taken in the direction of arrows of line 30—30 of FIGURE 1.
Figure 31:
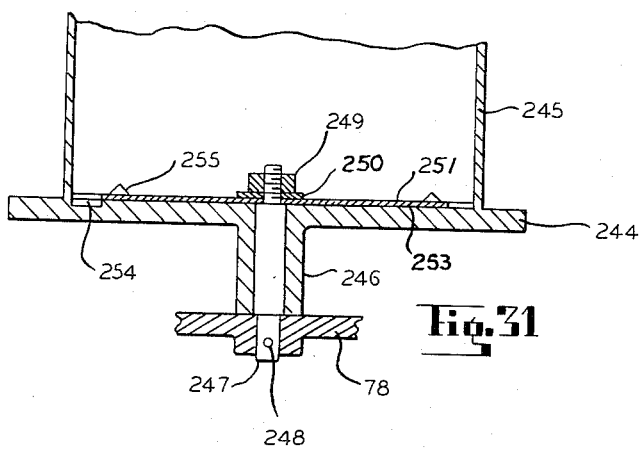
FIGURE 31 is a sectional view of the clip feeding unit taken on line 31—31 of FIGURE 30 with a center pivot shown intact.

The clip feeding unit 47 is shown more in detail in FIGURES 30 and 31. The base 244 is secured to the bracket 46 of the main frame. A shell 245 of a clip hopper is mounted rigidly with said base. A bearing 246 (FIGURE 31) extends from the base for journalling a pivot 247 on which is secured, by a pin 248, the worm driving gear 78. The upper end of said shaft 247 is secured by a nut 249 and washer 250 to a disc 251. All of the mountings on the pivot 247 are for rotation in either direction so that in the event of a jam by clips or otherwise the belt 79 will slip until a reverse rotation relieves the jam. The disc 251 is provided with notches 252 which are adapted for nesting clips stored in the hopper. During rotation of this disc the nested clips will slide on the surface 253 of the base until they reach a groove 254 in the base surface 253, said clips fall into the groove and slide into the tube 80 from which they are delivered to the wire cutting and clip attaching unit 45. The disc 251 carries projections 255 for preventing the bunching of clips stored in the hopper. The tube 80 is secured in a seat in the base 244 by rivets 256.

Figure 29:
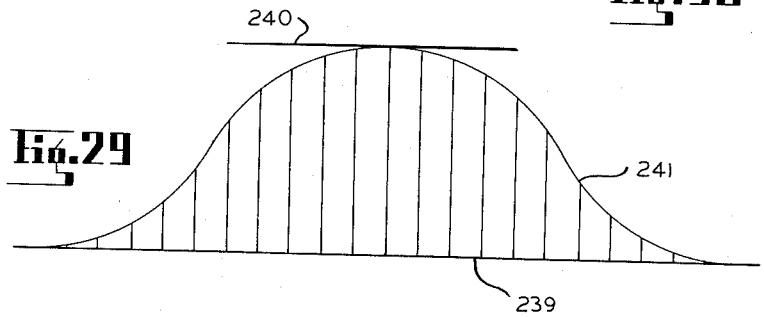
FIGURE 29 is a vector diagram characterizing the velocities of the feeding and tensioning of the wire during the feeding portion of an operative cycle of the machine shown in FIGURE 1.

A principal feature of this invention is the combined crank and chain drive whereby wave-like operative steps of feeding and tensioning wire is performed at velocities which vary wave-like from zero to summit and then inversely back to zero in each of said steps and FIGURE 29 is a vector diagram of the relations between constant driving speed and varying velocities during a wire feeding, or a wire tensioning, step of an operative cycle of the machine herein described. In FIGURE 29 the distances between the vertical lines represent the constant speed of the turning crank 50 during a feeding step of a cycle. The length of the vertical lines represent the everchanging wave-like velocities of the feeding wire to be from zero line 239 up to summit line 240 and then inversely back to zero as shown by the curve line 241. Since the steps of cutting the wire and attaching the clips occur at intervals between the feeding and tensioning steps and since consumption of power is decreased in proportion to velocity a supply of power is reserved for the steps of cutting and attaching clips to cut wire. Furthermore the damage to mechanism resulting from the continuous sudden starts and stops of feeding and tensioning steps of an operative cycle are largely eliminated and this provides for a smoother and more efficient operation of the machine of this invention.

To prepare the machine for operation first, a suitable coil of wire is secured by the clamps 69 and positioned on the top member 38 of the main frame; an end of the uncoiled wire is fed manually from the inside of the positioned coil into the takeoff tube 73, through tube 75 and through block 133 until the end of the wire enters between the plates 121 and 122 and under the disc 140. With the motor running pedal 66 is depressed while holding the wire manually in its fed position by suitable means. Actuation of pedal 66 will initiate an operative cycle of the machine during which the feeding step will withdraw wire from the positioned coil and feed it part way through the enclosure 77, and the cycle will end with the enclosure 77 opened. Secondly, the feeder unit 47 and clip tube 80 are loaded with clips. The free end of the wire is lifted out of the enclosure and firmly held from retracting back into the coil upon the second actuation of the pedal 66, with the motor running. During the second operative cycle of the machine it will feed a new loop of wire into the enclosure 77 and attach a clip to its free fed end. The enclosure will again be opened and will then be maintained in readiness for successive cycles of operation.

During each operative cycle, the crank 50 and the chain gears 81 and 83 for driving the cam shaft will complete one constant velocity revolution, however, due to the connections 53 and 60 with lever 55 and the chain 63 the wire feeding and tensioning roller unit 49 will make several forward and reverse revolutions which have wave-like velocities that vary: from zero to summit on the first 90 degrees turn of the crank 50, back to zero on the second 90 degrees turn of the crank, from zero to summit on the third 90 degrees turn of the crank and back to zero on the final 90 degrees turn of the crank. Therefore the step of tensioning a band of wire around an object begins and ends with zero velocities and also the step of feeding wire from its supply coil into the loop forming enclosure 77 also begins and ends with zero velocities. This feature of the present invention provides for the use of less energy for starting steps of operative cycles and also lessens the momentums in ending steps of operative cycles and at the same time provides for a smoother and more efficient operation of the machine.

Upon positioning an object on the support 37 and within the loop enclosure 77, with the motor running, upon depressing the pedal 66 intermittent movements of the mechanism will be initiated which will include the steps of the following operative cycle: the wire loop will be contracted and tensioned around the object in a plane guided by levers 115 and 116 by action of the wire roller 40. At the same time the wire retracted in contracting the loop and tensioning it around the object will be recoiled by the takeoff tube 73 back into the supply coil 68; the wire brake rod 231 will stop the movement of the wire by the action of cam 238; by cooperation of cams 188 and 226 and of the springs 189 and 227 the wire will be gripped by the jaw 218 and cut by punch 186. The gripped and cut end of the wire is forced into the opening of the clip, held in position by the anvil 179, by said punch 186; guide pin 172 will be withdrawn by action of cam 178 and the enclosure 77 closed by the action of cam 215. The guide pin 172 will then be moved inward by spring 174. The wire brake 231, gripping jaw 218 and cutting punch 186 will then be returned to normal positions by springs 189, 232 and 227. The anvil 179 releases the band securing clip from its enclosed position and admits a succeeding clip from the tube 80 to move into the enclosure by the action of cam 183. The punch 198 forces the band securing clip from the machine by action of cam 204. The wire starts to feed from supply coil 68 by reverse action of the wire roller unit 40; said anvil 179 positions its enclosed clip under action of spring 181; said wire is fed through the enclosure 77 with its end surface in aligned relation with the end wall surface of the first opening in the positioned clip; the punch 198, under action of cam 204 and spring 189, forces aligned end of fed wire into clip opening; the enclosure 77 is then opened by action of cam 215. The wedge 67 separates crank 50 from the flange 148 thereby withdrawing pins 149 from their corresponding holes in the crank and thereby ending the cycle initiated by depressing the pedal 66. The machine is now in readiness for a succeeding operative cycle.

Although various minor structural modifications might be suggested by those versed in the art, it should be understood that I wish to employ within the scope of the patent warranted hereon all such modifications as reasonably and properly come within the scope of my contribution to the art.

I claim as my invention:

1. In a banding machine, a guideway for positioning a loop of wire fed axially from a supply source about a bundle, said guideway including: a pair of elongated members having confronting sidewalls formed with cooperating grooves therein to receive said wire for guiding the same; linkage means connecting the members together in such a manner as to permit the confronting sidewalls thereof to swing toward each other to a first position for joining the grooves and from each other to a second position to open the grooves for permitting withdrawal of the wire therefrom; resilient means connected to said members for biasing the same to the first position and cam driven means for moving the member to the second position against the action of the resilient means.

2. The guideway defined in claim 1 together with a wire feeding and tensioning roll means having a cooperating disc whereby wire fed from a supply source to the roll means is guided by said disc in a complete circuit about said roll means.

3. The feeding and tensioning roll means defined in claim 2 together with guide means having openings therethrough in offset crosswise relation whereby the wire fed by the roll means is guided in offset relation past the wire entering said roll means.

4. The guideway defined in claim 1 together with an enclosure for holding a clip in position for securing the fed end of said wire loop.

5. The enclosure defined in claim 4 together with cam driven anvil means wherein a band securing clip is positioned within said enclosure.

6. The guideway defined in claim 1 together with cam driven punch means whereby the fed end of the loop is secured to the positioned clip.

7. The guideway defined in claim 1 together with lever means pivoted to swing in a plane of the fed loop whereby the plane of the loop is maintained while the loop is being contracted about a bundle.

8. The guideway defined in claim 1 together with a rotary mounted bent tubular guide means whereby surplus wire retracted from contracting said loop about a bundle is guided back into the supply source.

9. In a banding machine, a roll drive system for feeding wire axially from a supply source about a bundle and reversible for tensioning the fed wire about said bundle by retracting a portion of the fed wire, said roll drive system including: lever means pivoted at one end for swinging in a plane parallel to the plane of the chain belt means; connecting means from the opposite end of said lever means to said chain belt means; pitman rod connecting means from said lever means, intermediate of its said ends, to the driving crank means; sprocket means for said chain belt means to reciprocate about and a wire feeding and tensioning roll means mounted to one of said sprocket means; said pitman rod connecting means being adjustable as to said intermediate position on the lever means whereby an extent of a reciprocating movement of said chain belt means may be predetermined.

10. The roll drive system defined in claim 9 wherein the feeding and tensioning steps of a banding cycle are both actuated by one revolution of said crank means.

11. The roll drive system defined in claim 9 together with adjustable friction means mounted between said roll drive sprocket means and said feeding and tensioning roll means whereby the tension that can be exerted in the wire, by the roll means, may be predetermined.

12. The roll drive system defined in claim 9 wherein the feeding and tensioning steps of a banding cycle are both actuated with respective accelerating and decelerating velocities.

(References on following page)

References Cited in the file of this patent

UNITED STATES PATENTS

| | | |
|---|---|---|
| 632,608 | Whittington | Sept. 5, 1899 |
| 1,197,824 | Hess | Sept. 12, 1916 |
| 1,199,286 | McBee | Sept. 26, 1916 |
| 1,555,564 | Frost | Sept. 29, 1925 |
| 1,650,843 | McChesney | Nov. 29, 1927 |
| 1,868,182 | Sullivan | July 19, 1932 |
| 2,040,493 | Mardigian et al. | May 12, 1936 |
| 2,085,082 | Delany | June 29, 1937 |
| 2,136,225 | Williams | Nov. 8, 1938 |
| 2,198,695 | Cummings | Apr. 30, 1940 |
| 2,281,603 | Shoup | May 5, 1942 |
| 2,409,652 | Workman | Oct. 22, 1946 |
| 2,416,869 | Vining et al. | Mar. 4, 1947 |
| 2,575,899 | Vining et al. | Nov. 20, 1951 |
| 2,597,675 | Sackett | May 20, 1952 |
| 2,632,381 | Buckland | Mar. 24, 1953 |
| 2,742,851 | Fryer | Apr. 24, 1956 |
| 2,775,140 | Loos | Dec. 25, 1956 |

FOREIGN PATENTS

| | | |
|---|---|---|
| 470,138 | Germany | Jan. 9, 1929 |